United States Patent [19]

Anderson et al.

[11] Patent Number: 5,158,328

[45] Date of Patent: Oct. 27, 1992

[54] UNIVERSAL DUCT ELBOW AND CONNECTOR PLATE

[75] Inventors: Charles B. Anderson, Jacksonville, Tex.; Charles R. Kenrick, Spring Lake, Mich.

[73] Assignee: Builders Pride Inc., Jacksonville, Tex.

[21] Appl. No.: 621,756

[22] Filed: Dec. 4, 1990

[51] Int. Cl.⁵ .......................................... F16L 11/00
[52] U.S. Cl. ................................... 285/168; 285/181; 285/163; 285/424; 29/513
[58] Field of Search ............... 285/181, 183, 168, 163, 285/165, 424, 182; 98/DIG. 7; 29/513

[56] References Cited

U.S. PATENT DOCUMENTS

| | | | |
|---|---|---|---|
| 1,661,674 | 7/1925 | Osborn | 285/424 |
| 2,086,007 | 3/1936 | Tompkins | 285/183 |
| 2,215,318 | 9/1940 | Bristol | 29/513 |
| 2,823,703 | 2/1958 | Nusser | 285/181 |
| 3,185,506 | 8/1963 | Szlashta | 285/183 |

*Primary Examiner*—Randolph A. Reese
*Assistant Examiner*—Timothy Aberle
*Attorney, Agent, or Firm*—Price, Heneveld, Cooper, DeWitt & Litton

[57] ABSTRACT

A universal duct elbow as for the vent system of a clothes dryer, formed of a body and a pair of swivel sleeves rotational on the body. The body has an outer 180° portion of a configuration like that of a quarter toroid, and an inner 180° portion like a square type elbow. The center line radius is less than about 0.6 of the duct diameter, enabling a duct assembly using the elbow to fit into a space only slightly larger than the duct diameter. The body is formed of an L-shaped plate having flow openings in the two legs of the L, plus two joined mirror image, arcuate elements. At these sleeves are radially extending flanges of the legs of the L to enable attachment to a wall.

14 Claims, 3 Drawing Sheets

UNIVERSAL DUCT ELBOW AND CONNECTOR PLATE

RELATED APPLICATIONS

This application is related to the copending applications Ser. No. 07/621,757, filed Dec. 4, 1990, entitled DRYER DUCT AND VENT ASSEMBLY, Ser. No. 07/621,774, filed Dec. 4, 1990, entitled UNIVERSAL DRYER DUCT AND VENT, and Ser. No. 07/621,775, filed Dec. 4, 1990, entitled SOFT CUFF CORRUGATED DUCT.

BACKGROUND OF THE INVENTION

This invention relates to a duct elbow and a connector plate useful, for example, for an exhaust vent system for clothes dryers. Use of metal components for vent duct for clothes dryers and the like is highly desirable. However, the persons that frequently install dryers are delivery people hired by retailers to drive truck and unload equipment. They too often are without the metal working skills required to make an effective dryer exhaust assembly and hookup of metal components.

Another difficulty in installing clothes dryer vent systems is the limited space available to do the work. Dryers typically are fitted into a space just wide enough to receive them, i.e., straddled by walls, a washing machine, a cabinet, or shelving. Typically, therefore, it is practically impossible to make the vent connection after the dryer is against the wall. By making the connection when the dryer is still spaced several feet from the wall too often results in not being able to get the dryer close to the wall after the installation or, if it is pushed close to the wall, the hose sometimes gets crushed, kinked and/or flattened, resulting in poor air flow.

If elbow components are employed in the vent duct assembly, the dryer must remain a considerable distance from the back wall adjacent which the dryer is located, because the elbows require a depth spacing substantially greater than the elbow duct diameter.

SUMMARY OF THE INVENTION

An object of this invention is to provide a sheet metal duct elbow capable of interfit with another like elbow, with standard sheet metal components such as a duct, a dryer outlet, or a wall outlet. The elbow can be connected using a standard band clamp, or alternatively using a novel snap connection built into the elbow.

Another object is to provide a duct elbow requiring a depth spacing only an inch or less greater than the elbow duct diameter, e.g., four and three-fourths inches for a four inch duct diameter.

Another object is to provide a duct elbow having swivel sleeves on both ends, each sleeve capable of rotating on its axis relative to the elbow body. This enables a corrugated duct assembly containing the elbow to be reoriented or displaced without disassembly of the duct assembly.

Another object is to provide a novel snap-in connection for duct elbows and connecting components. Delivery people with low levels of skill can connect it quickly and easily, achieving excellent flow characteristics and safe operation. No special tools are required.

Another object of this invention is to provide a dryer ventilation elbow capable of enabling the dryer to be positioned directly adjacent and in front of the outlet opening in the wall where the hot air is vented, or just as readily to be several feet laterally of the wall outlet, using the same duct arrangement and connectors.

Another object is to provide a unique duct elbow. Each elbow connector has one end attachable to a duct element with a rotary, i.e., swivel, connection and the second end attachable to a dryer, a wall outlet, or another duct element, as desired. This second end is also rotary. These attachments have interconnectable elements for a direct snap fit such as a sliding telescopic interfit, or alternatively enable a clamped fit.

Each elbow connector preferably has a swivelable female snap fitting on one end and a swivelable male snap fitting on the other end. Resilient snap type retainers hold the connections together, once made. The female end also has longitudinal slots to enable the end to optionally serve as a draw band collar.

The outer 180° of the elbow body has a round elbow configuration like that of a quarter toroid, while the inner 180° has a square elbow configuration. The elbow can be attached to a wall outlet using a novel connector plate. The elbow has a flange on each end, normal to the axis of the sleeve at that end. The cavity plate is mountable to the wall, has a flow through opening, and has bendable tabs for attachment to the flange on the elbow.

These and other objects, advantages and features of the invention will become apparent from the following detailed description in conjunction with the drawings.

DESCRIPTION OF THE PREFERRED EMBODIMENT

Referring now specifically to the drawings, an assembly 110 is there shown, such including a fragmentary portion of a conventional dryer subassembly 12 and a wall 18, with a dryer duct assembly 114 extending therebetween. Each elbow has each end rotatable on the axis thereof, the elbow body being formed of simple metal components. Snap connectors are provided between the male and female telescopically interfit connector sleeves, eliminating the need for other fasteners such as ring clamps.

Figure 1:
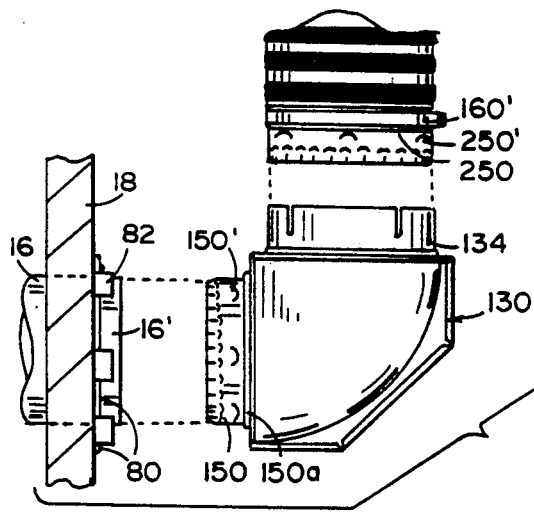
FIG. 1 is a side elevational view showing the invention.
Figure 4:
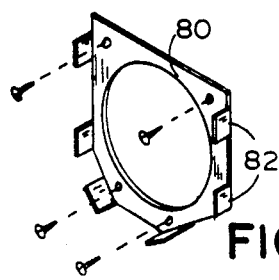
FIG. 4 is a perspective view of an attachment plate useable to secure the duct assembly to the wall.

When using this invention, there may be two duct subassemblies, one of which is connected to the dryer and the other of which is connected to the wall outlet pipe. Later, these two are interconnected to each other by a workman leaning over the dryer after it is put in place. Sometimes, however, it is desirable to employ only one section of flexible duct if, e.g., there is plenty of space around the dryer to do that. In FIG. 1 is depicted duct 20 between two elbow connectors 130. Hence, duct 20 could be of two separate duct sections interconnected at one end of each with the other duct section not specifically shown. Therefore, this invention should not be considered limited to just one duct section, or any particular number of sections, except as set forth in the claims hereof.

The dryer includes a conventional cylindrical outlet duct stub 15, typically of a male type, sometimes crimped around its periphery so as to decrease its diameter sufficiently to readily fit within the outer diameter of a female connector element. In wall 18 is outlet conduit 16 which has a portion 16' which projects through the wall and typically has a female type receiver to receive a male type fitting of the duct assembly.

Figure 2:
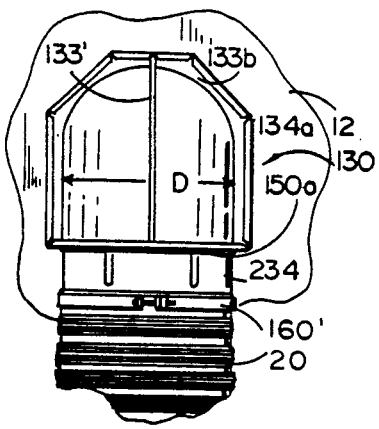
FIG. 2 is an end elevational view of the upper portion of the assembly in FIG. 1.

This assembly employs unique elbow connector components and a flexible duct component, which are universal in nature; that is, the elbow connectors can attach to the dryer, to the wall outlet, to the flexible duct, and/or to each other, while the flexible duct can attach to the elbow connectors and/or to another like flexible duct. This is without the use of added devices such as hose clamps, except sometimes at the dryer and the wall outlet. Each of the elbow connectors 130 preferably has a female sleeve 134 on one end and a male sleeve 150 on the other end, these two being shown at an angle to each other of approximately 90°, and communicating with each other through a smoothly curved hollow space within body 131 of connector elbow 130. Smooth air flow is facilitated by having the outer 180° of the elbow surface comparable to the surface of a quarter toroid, forming a curvilinear surface semicircular in cross section. As is known, air flow around a bend tends to be more dense toward the outside of the elbow, such that the outer surface has a major effect on the flow characteristics. The inner 180° of the elbow surface is of square configuration. The elbow is of unique overall configuration. Moreover, it has a remarkably small centerline bend radius of less than about 0.6 diameter. That is, the length of the radius from the centerline C/L of the elbow (FIG. 1) to the radial center C for the elbow is actually less than about 0.6 of the elbow conduit diameter D (FIG. 2). Conventional elbows have a centerline radius of at least 1 diameter. The novel close tolerance elbow enables it and connected duct to fit within a space of about three-fourths inch or less greater than the duct diameter, e.g., a four inch duct can be fit with its elbows in a space of about four and three-fourths inch depth or less between the dryer and the wall. This is remarkably close. Yet, the air flow is excellent. Moreover, each of the sleeves is rotatable relative to the connector subassembly for ease in orientation of the components for interconnection of the duct subassemblies with each other and with the dryer and wall outlet at various angular arrangements and distances.

The conventional male connector 15 on dryer 12 may or may not be crimped in the manner shown.

Female sleeve 134 has a series of peripherally spaced, axially extending slots 135 which enable slight enlargement or contraction of this sleeve, the enlargement enabling easy interconnection sliding fit by receiving standard male connector 15, and being radially contractible by optional clamp 160 when tightened down onto sleeve 134. The female sleeve 134 is rotatable about its axis, i.e., swivelable, relative to the main body of elbow connector 130, because of the interfit therebetween, as described more fully hereinafter. The male sleeve 150 on the other end of connector 130 is peripherally crimped in like fashion to the typical male connector 15 on the dryer so as to reduce its diameter sufficiently to fit within a cooperative female sleeve 234 in one end of the flexible duct 20. This male sleeve is also rotationally attached to the body of elbow connector 130 so as to be rotatable about its central axis, as explained more fully hereinafter. At the inner end of, and around the outer periphery of each sleeve of each elbow connector is a flange transverse to the sleeve axis, e.g., flanges 134a and 150a on upper connector 130.

Between the crimped portion of sleeve 150 and its connection to the elbow body is a series of flexible semicircular or arcuate tabs 150' which protrude diagonally and radially outwardly from the housing on a small acute angle away from the open end of the connector, for abutment interconnection with an inturned end flange inside female sleeve 234. That is, the outer end of sleeve 234 is turned radially and axially inwardly, and pressed flat against the inner periphery of the sleeve to form an inner annular flange oriented axially inwardly of the sleeve. Therefore, its inner edge forms a stop surface of the type depicted in FIG. 7, to engage and secure the outwardly divergent protrusions 150' and lock the female collar or sleeve onto the male collar or sleeve when slidably interconnected, as explained in more detail hereinafter. Each elbow connector female sleeve, e.g., sleeve 134, also has the outer end turned radially and axially inwardly, flat against the inner periphery of the sleeve, so that its inner edge forms a stop of the same nature as depicted in FIG. 7.

Figure 7:
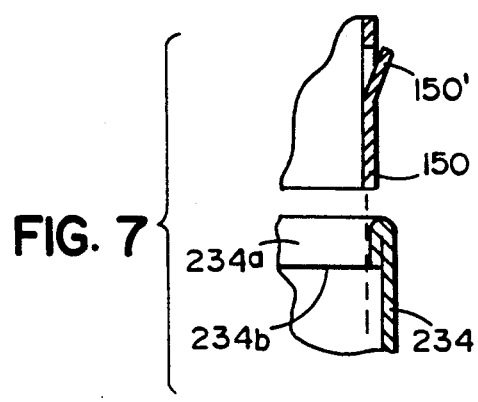
FIG. 7 is an enlarged, fragmentary view of the snap fit components of male and female sleeves to be interfitted.
Figure 9:
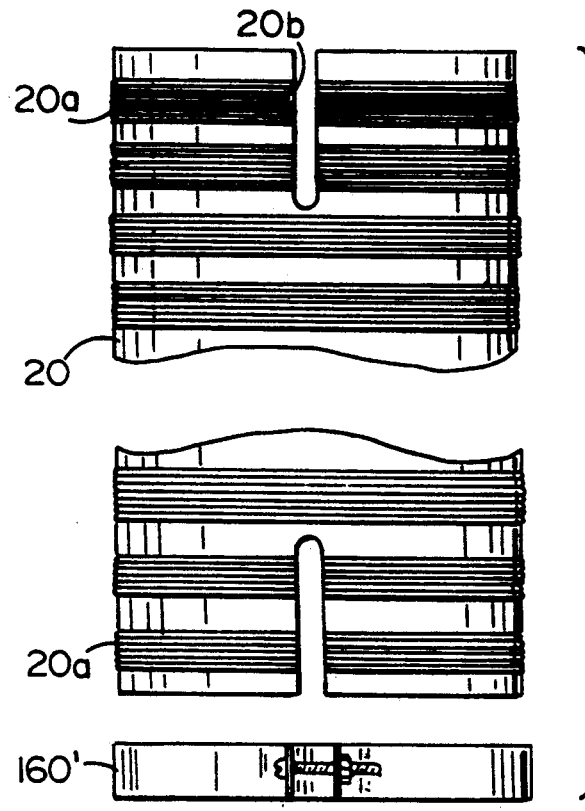
FIG. 9 is a fragmentary elevational view of a duct specifically showing soft cuffs on the ends thereof.

Referring more specifically to FIG. 7, this female sleeve 234 has the inwardly turned end flange 234a to form a peripheral edge 234b inside the sleeve. On male connector 150 is the radially outwardly protruding set of resilient tabs 150' extending at a small acute angle to the male sleeve and here shown to have ends which are arcuate in shape. Hence, when the slightly smaller diameter male sleeve 150 is inserted into female sleeve 234, these tabs 150' will be temporarily deflected radially inwardly and then snap back by their inherent resilience radially outwardly behind edge 234b of flange 234a, to prevent withdrawal of the male member. This interconnection makes it unnecessary to employ a conventional clamp ring. The axially extending slots 235 in sleeve 234 enable the female sleeve 234 to readily expand, if necessary to fit with male sleeves not containing tabs 150'. The opposite end of female sleeve 234 extends within the adjacent end of flexible conduit 20, and is secured in place as by a peripheral clamp 160, as depicted in FIG. 1. Flexible corrugated duct 20 is of metal, preferably aluminum, formed by conventional techniques to have many annular peripheral corrugations so as to be axially extendible, contractible and/or laterally flexible to accommodate the particular orientation and length necessary. Each end of the corrugated duct is specially worked to create a soft cuff 20a (FIG. 9) thereat. More specifically, a portion at each end of the duct is rolled, or preferably die compressed by radial dies, to compress the corrugations to a generally cylindrical condition of a diameter, both inner and outer, substantially the same as the inner diameter of the remainder of the duct. These compressed end portions are longitudinally slit to form at least one, and preferably at least two, longitudinal, i.e., axial, slots 20b. Hence, these compressed slit portions form cuffs which can be radially contracted to a smaller diameter by an adjustable peripheral clamp 160' for compressing the cuffs onto the sleeves 235/250.

Figure 8:
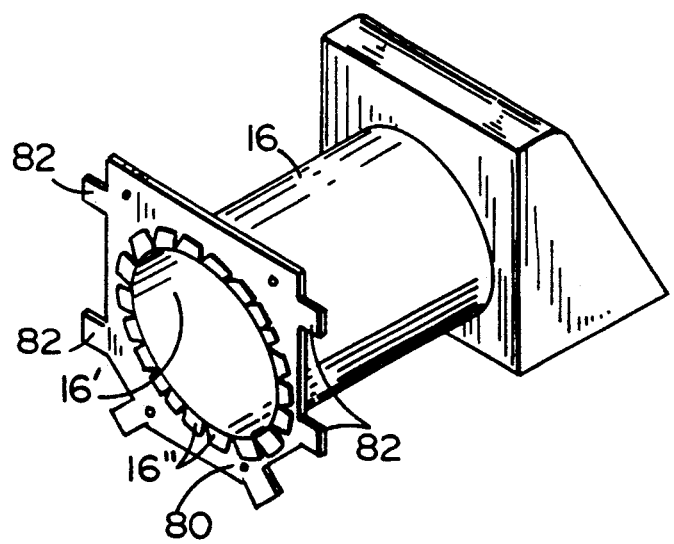
FIG. 8 is a perspective view of a vent hood and tail pipe showing one type of connection using a connector plate.

In the opposite end of metal duct 20 is another sleeve, here shown to be a male sleeve 250, the outer end of which is crimped to reduce its overall diameter. The opposite end of sleeve 250 extends inside of duct 20, with the duct being clamped therearound by conventional clamp 160'. Between the crimped end and the clamped end of this sleeve is a set of outwardly extending protrusions 250' like those previously described at 150', for interengagement with the female sleeve 134 of lower connector 130. Basically, the lower connector 130 is like upper connector 130, having a female sleeve 134 on one end and a male sleeve 150 on the other end, the body thereof being hollow to allow free flow of air between the inlet and outlet sleeves. Male sleeve 150 includes lateral protrusions 150'. This male member fits within a conventional outlet conduit 16 at wall 18. Lower connector 130 may be secured to the wall directly with screws through flange 150a, after trimming conduit 16 to be flush with the wall. Alternatively, it may be held by cutting tabs 16" into stub conduit 16 (FIG. 8) and bending them over the outer surface of plate 80 to secure plate 80 against the wall. Then tabs 82 are bent around the periphery of flange 150a after inserting collar 150 of lower connector 130 into conduit 16.

Another alternative is to cut conduit 16 flush with the wall surface, attach plate 80 over the opening of conduit 16 by securing it to the wall with conventional screws, and bending tabs 82 around the periphery of flange 150a after inserting collar 150 of lower connectors 130 into conduit 16.

Another alternative is to cut a longitudinal slit into conduit 16, place collar 150 of connector 130 into conduit 16, and then use a band clamp 160 to compress conduit 16 around collar 15.

Figure 5:
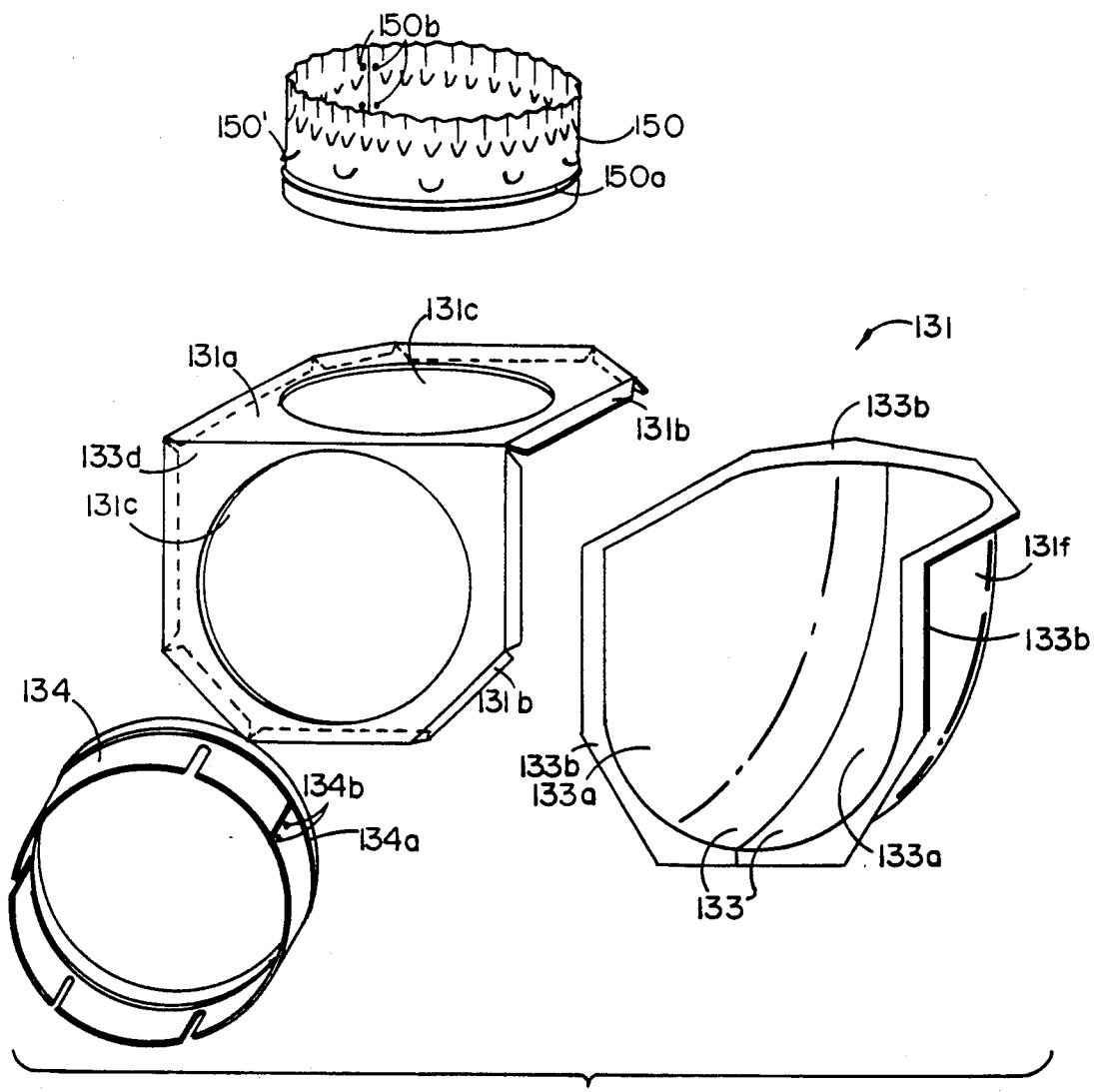
FIG. 5 is an exploded view of the elbow connector and a portion of duct.

Each of the elbow connectors 130 is formed of a thin metal, preferably aluminum, including a body and the two previously described male and female sleeves. The body 131 is formed from two members. More specifically, referring to FIG. 5, there is shown one member, an L-shaped plate 131a, having two planar legs generally normal to each other and integrally interconnected at the bight, and having a series of bendable elongated flanges 131b around the periphery of the L-shaped plate. In each leg of the L-plate is die cut a circular opening 131c. These two openings receive the respective sleeves 150 and 134. This L-plate may be formed by the steps of die cutting openings 131c into the flat plate, die forming and optionally bending flanges 131b to a position normal to the legs of the plate, and then bending the plate along bight line 131d to form the two orificed planar legs.

Figure 3:
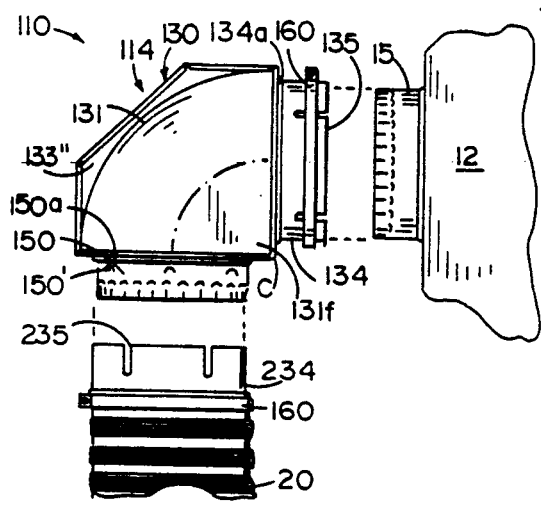
FIG. 3 is an end elevational view of the lower portion of the assembly in FIG. 1.
Figure 3:
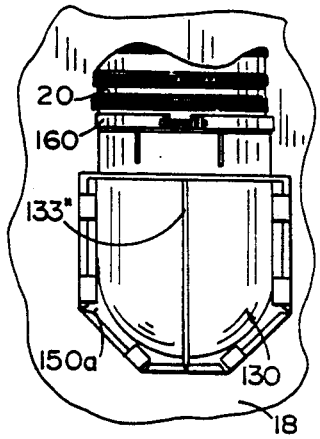

Interfitting with L-plate 131a is another member 133 the outer 180 degree part of which is a quarter-toroid. Extending integrally from this outer part to the L-plate is a pair of parallel, generally flat quadrants 131f. This outer half portion of a quarter-toroid is a hollow shell preferably made up of one piece from mirror image half components. This member 133, and specifically mirror image half components 133a, has peripheral flanges 133b in two planes normal to each other and to the quadrants 131f, to interfit with the flanges of L-plate 131a. Each also has an outwardly projecting peripheral flange 133' (FIG. 2) and 133" (FIGS. 1 and 3), which engage each other and are secured together. Hence, when the outer portion is superimposed over the L-plate, the flanges of the L-plate can be bent over the flanges of the quarter toroid portion to secure them together and thereby form a smooth duct open only through orifices 131c.

Figure 6:
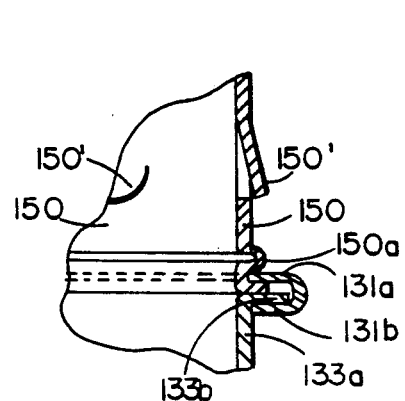
FIG. 6 is an enlarged, fragmentary view of a portion of the swivel in the elbow connector.

Sleeves 134 and 150 are inserted and connected into these orifices. More specifically, each of these sleeve members is normally formed of a disconnected ring having a shoulder toward one axial end, i.e., shoulder 150a in sleeve 150, and shoulder 134a in sleeve 134. Male sleeve 150 also is crimped at the opposite axial end, and stamped to form angular protrusion tabs 150'. One end of the ring is then inserted into an orifice 131c until shoulder 150a (or 134a) abuts the leg of the L-plate. Then the inwardly extending portion of the ring is radially outwardly deformed 90° to be flattened on the inner side of the L-pate, radially-outwardly extending annular shoulder 150a or 134a is flattened on the outside of the L-pate, and a pair of rivets 150b or 134b are inserted to secure the overlapping ends of the respective sleeve rings. This arrangement is depicted in FIG. 6 for sleeve 150.

In assembly of this apparatus, the male end 150 of one of the elbow connectors 130 may be inserted into the outlet 16 in the wall 18, and attached to one end of metal expandable duct 20 by inserting the male sleeve 250 into the female sleeve 134, the projections 250' catching behind the flange of the female sleeve 134 to hold the two in interfitted relationship, thus axially securing the two together. This sleeve 250 has its other end within the end of flexible duct 20 retained by clamp 160'. The other end of duct 20 has one end of a female sleeve 234 inserted therewithin and secured by clamp 160'. The male end 150 of the other connector 130 is inserted into the female sleeve 234, with protrusions 150' catching behind the flange 234b (FIG. 7) to retain the two in interconnected relationship. The female end 134 of connector 130 is thus ready to be connected to the outlet of dryer 12. The unit can stand vertically, if desired, from a lower wall outlet to an upper dryer outlet, or from an upper wall outlet to a lower dryer outlet. The unit can also extend laterally along a wall. Each cylindrical end of each connector 130 is capable of swiveling rotation about its axis, to enable the unit to adapt to various circumstances and arrangements. The duct is torsionally rigid. The swivel prevents kinking of the duct and permits the dryer to be moved without disassembly of the duct assembly, yet without twisting the fittings and causing stress that could damage the elbows or attaching hardware. Ultimately, the dryer is positioned adjacent the wall and the last connection made simply by the installer reaching over the dryer, sliding the last female and male connectors together to an interlocked condition. The elbow requires only relatively small space, has excellent flow characteristics, is maneuverable with attached duct to reposition an assembly without requiring disassembly, is attachable to duct, to a dryer pipe, to a vent tail pipe, to another elbow, and to other standard components.

Manufacture of the apparatus is straightforward and can be automated. The unit can be readily installed by one of little skill, and, in fact, no skill in the metal working field, to produce a safe arrangement.

Conceivably, various details of this invention, as illustrated in the preferred embodiment, may be modified to suit a particular type of installation. Hence, the invention is not intended to be limited to the specific embodiment set forth as illustrative, but only by the scope of the appended claims and the reasonably equivalent structures to those defined therein.

The embodiments of the invention in which an exclusive property or privilege is claimed are defined as follows.

1. An air flow duct elbow connector comprising:
   a body and a pair of openings, and first and second cylindrical, flow-through, swivel sleeves in said openings, each sleeve being rotational on said body about its cylindrical axis;
   each of said sleeves being a male or female telescopic member;
   said body having a radially outer portion which is like an outer portion of a quarter-toroid; and
   said outer portion being formed of two joined, mirror image, arcuate, metal elements and an L-shaped plate secured to said elements, the legs of said plate each having one of said openings.

2. The elbow connector in claim 1 wherein said male member has radially outwardly diagonally protruding tabs extending toward said body to form abutment surfaces, and said female member has an inturned flange extending axially toward said body to form an abutment surface.

3. The elbow connector in claim 1 wherein said legs of said L-shaped plate extend radially beyond said arcuate elements to form a peripheral flange for attachment to a wall outlet.

4. The elbow connector in claim 3 including a pair of cylindrical sleeves attached to said body with a swivel attachment, each sleeve capable of rotating about its axis.

5. The elbow connector in claim 4 having in combination therewith an attachment plate, said attachment plate having a central opening receiving one of said sleeves, and having peripheral tabs for bending around one of said peripheral flanges.

6. An air flow duct elbow comprising:
   a body having an outer 180° peripheral portion having a curvilinear configuration comparable to that of a quarter toroid, and a center line radius less than about 0.6 of the duct diameter.

7. The elbow in claim 6 wherein said body has an inner 180° peripheral portion which has a square elbow type configuration.

8. An air flow duct elbow comprising:
   a body having an outer 180° peripheral portion having a curvilinear configuration comparable to that of a quarter-toroid, and a center line radius less than about 0.6 of the duct diameter;
   said body having an inner 180° peripheral portion which has a square elbow type configuration; and
   said square type inner portion comprises an L-shaped member having a pair of legs and having a flow-through orifice in each leg thereof, and a pair of opposite, generally planar walls extending from said L-shaped member and integrally extending into said outer portion.

9. The elbow in claim 8 including at least one cylindrical flow-through sleeve extending from said L-shaped member and having a swivel connection thereto to be rotatable on said body about its cylindrical axis.

10. The elbow in claim 8 including a cylindrical flow-through sleeve extending from each leg of said L-shaped member and having a swivel connection thereto to be rotatable on said body about its cylindrical axis.

11. The elbow in claim 8 wherein said planar walls are integral with said outer portion, and said outer portion is formed of two half members having radially outwardly extending flanges joined together.

12. The elbow in claim 11 wherein said joined, radially outwardly extending flanges extend axially around the curve of said curvilinear configuration to said legs of said L-shaped member.

13. A method of attaching a duct element around a flow-through orifice in a wall having a vent tail pipe or exhaust pipe with a portion of said pipe extending through the wall at the orifice, comprising the steps of:
   a) cutting longitudinal slits in the pipe portion extending through the wall;
   b) providing a plate having a flow-through opening corresponding to the wall orifice, a flange around said opening, and a plurality of bendable tabs from said flange;
   c) placing said plate at the orifice in the wall, and bending the slit pipe portion radially outwardly through said plate opening and against said plate flange to hold said plate to said wall;
   d) providing a duct element having a peripheral flange;
   e) placing said duct element flange adjacent said plate; and
   f) bending said tabs on said plate over said duct element peripheral flange.

* * * * *